(12) United States Patent
Wooldridge et al.

(10) Patent No.: US 9,329,067 B2
(45) Date of Patent: May 3, 2016

(54) SYSTEM AND METHOD FOR DETERMINING WEIGHT

(75) Inventors: Donald Wooldridge, Dunkirk, MD (US); Mark Richard, Pasadena, MD (US)

(73) Assignee: BATCHING SYSTEMS, INC., Prince Frederick, MD (US)

( * ) Notice: Subject to any disclaimer, the term of this patent is extended or adjusted under 35 U.S.C. 154(b) by 175 days.

(21) Appl. No.: 13/291,366

(22) Filed: Nov. 8, 2011

(65) Prior Publication Data

US 2013/0112529 A1    May 9, 2013

(51) Int. Cl.
| | |
|---|---|
| *B65G 43/00* | (2006.01) |
| *G01F 1/86* | (2006.01) |
| *B65B 1/44* | (2006.01) |
| *G01G 9/00* | (2006.01) |
| *G01G 13/24* | (2006.01) |

(52) U.S. Cl.
CPC ... *G01F 1/86* (2013.01); *B65B 1/44* (2013.01); *G01G 9/00* (2013.01); *G01G 13/248* (2013.01)

(58) Field of Classification Search
CPC ................ B65B 1/44; B65B 1/48; G01F 1/86
USPC .................. 198/348–373, 502.1, 532; 222/55
See application file for complete search history.

(56) References Cited

U.S. PATENT DOCUMENTS

| | | | | |
|---|---|---|---|---|
| 5,808,242 | A * | 9/1998 | Satake et al. ............... | 177/210 C |
| 6,526,120 | B1 * | 2/2003 | Gray et al. ...................... | 378/57 |
| 6,640,158 | B1 * | 10/2003 | Brandt, Jr. .................... | 700/240 |
| 6,662,832 | B2 * | 12/2003 | Baker ............................ | 141/234 |

* cited by examiner

*Primary Examiner* — William R Harp
(74) *Attorney, Agent, or Firm* — John T. Whelan (57) ABSTRACT

A system is provided for feeding a stream of material. The system includes a feeder, a material density portion, a detector, a weight calculator and an indicator. The feeder can output a portion of the stream of the material from a first position to a second position. The material density portion can generate a density signal based on the density of the material. The detector can detect a volume of the portion of the stream of the material without contacting the portion of the stream of the material and can generate a volume signal based on the detected volume. The weight calculator can calculate a weight based on the density signal and the volume signal and can generate a weight signal. The indicator can provide an indication signal based on the weight signal.

18 Claims, 5 Drawing Sheets

SYSTEM AND METHOD FOR DETERMINING WEIGHT

BACKGROUND

In industry, batching systems are used to continuously divide large amount of material or objects into smaller portions that can then be packaged for distribution. Conventional batching systems are typically very flexible. If more than one type of material is being produced, with conventional batching systems, it is possible to continue running a batching system with no changeover of parts. This allows the batching process to continue uninterrupted saving valuable time and money.

Modern batching systems are very versatile and can be used with several different types of materials. It is possible to package material by count, weight, or volume, depending on the needs of the user. Batching systems can be used in short or long term production runs with a variety of product sizes.

Perhaps the most valuable benefit that batching systems provide is accuracy. Batching systems can optically scan and verify the amount of material in each batch. This allows for a better and more precise packaged product.

Figure 1A:
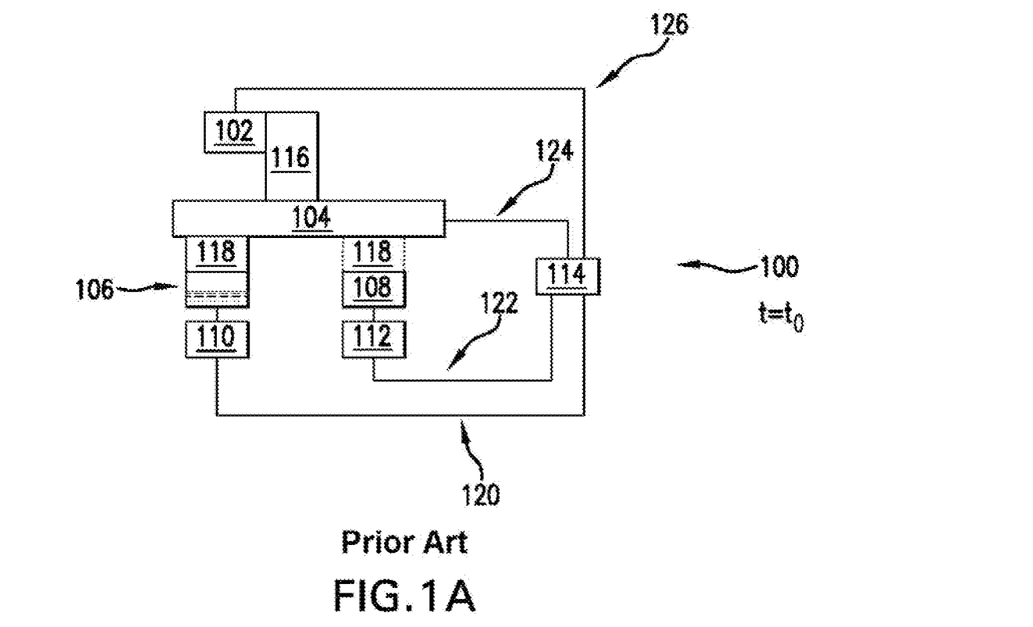
FIGS. 1A-C illustrates a conventional material batching system at times $t_0$, $t_1$, and $t_2$, respectively.
Figure 1B:
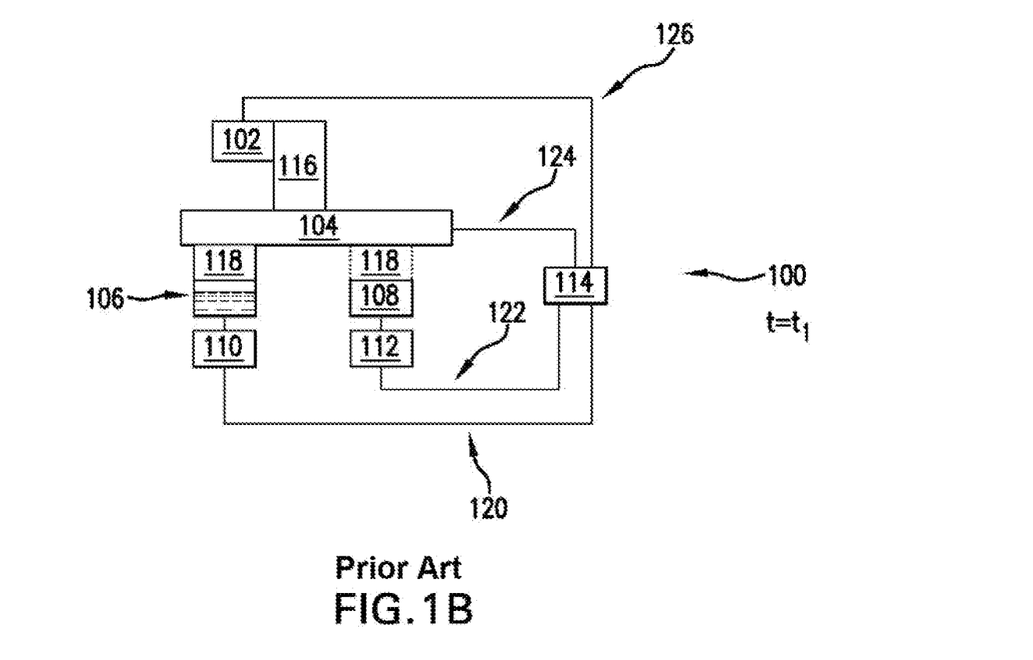
Figure 1C:
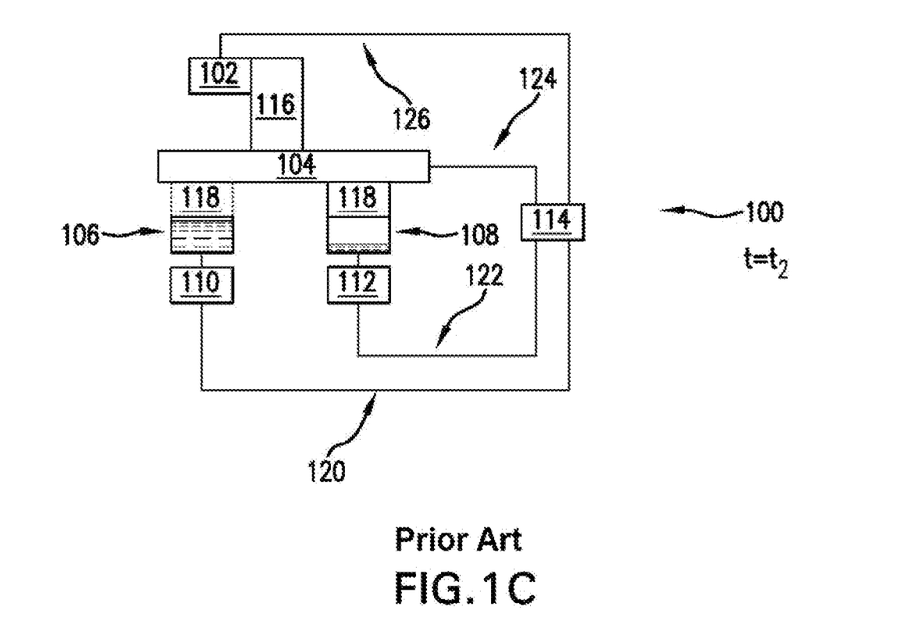

FIGS. 1A-C illustrate a conventional material batching system 100 at times $t_0$, $t_1$, and $t_2$, respectively. For purposes of discussion, presume that system 100 is batching oats.

As illustrated in FIG. 1A, system 100 includes a feeder or feeding portion 102, a deflector 104, a collector 106, a collector 108, a scale 110, a scale 112 and a controller 114.

Deflector 104 is arranged to receive a stream of material 116 from feeding portion 102. Collector 106 is arranged to receive a stream of material 118 from deflector 104. Collector 108 is additionally arranged to receive stream of material 118 from deflector 104. Controller 114 is arranged to receive a weight signal 120 from scale 110 and to receive a weight signal 122 from scale 112. Deflector 104 is arranged to receive a deflector control signal 124 from controller 114. Feeding portion 102 is arranged to receive a feeding portion control signal 126 from controller 114.

Feeding portion 102 may be any known device or system that is able to feed material from a source (not shown) to deflector 104. Non-limiting examples of feeding portion 102 include a hopper, a conveyer belt, a screw, etc.

Deflector 104 may be any known device or system that is able to receive material from feeding portion 102 and then dispense the material into one of collector 106 and collector 108. In particular, in a first state, deflector 104 deflects stream of material 116 from feeding portion 102 as stream of material 118 into collector 106. In a second state, deflector 104 deflects stream of material 116 from feeding portion 102 as stream of material 118 into collector 108. Non-limiting examples of deflector 104 include a deflector as described in U.S. Pat. No. 6,799,684 B2, the entire disclosure of which is incorporated herein.

Collector 106 and collector 108 may be any known device or system that is able to receive material from deflector 104. Scales 110 and 112 may be any known device or system that is able to determine the weight of material stored in collector 106 and collector 108, respectively. Non-limiting examples of collector 106 and collector 108, include boxes, bags, containers, or drums.

Controller 114 may be any system or device that is operable to control feeding portion 102 and deflector 104. Non-limiting examples of controller 114, include a computer, server, or motor.

A user may use system 100 to batch an amount of material into smaller predetermined amounts, or batches. For purposes of discussion, presume that a user (not shown) uses system 100 to batch oats. In general a bulk source of material is provided to a receiving receptacle. The material is fed from the receptacle onto feeding portion 102 in a steady stream which is then carried to the end of feeding portion 102, where the material falls off as stream of material 116. The material falls off of feeding portion 102 and is deflected into collector 106. Scale 110 measures the amount of material being deflected into collector 106 until it finds that the amount of material has reached the predetermined limit.

The predetermined limit is based on volume, or weight, of material that can be fit into a package. At this time controller 114, switches the deflector to a different position and begins filling up collector 108. While this is happening the material in collector 106 may be taken and emptied into a packaging system which can then be shipped. Once emptied, collector 106 is put back into position until scale 112 has measured that collector 108 is full. Now controller 114 switches the deflector and material is deposited into collector 106 once again. Collector 108 can be taken and emptied into a packaging system and then returned.

In operation, a large volume of oats (not shown) are dumped into a receiving receptacle (not shown), which feeds the dumped oats to feeding portion 102. The oats are conveyed from one end of feeding portion 102 (closest to the receiving receptacle) to the other end of feeding portion 102, where they continue as stream of material 116.

Deflector 104 will be in one of two states. In its first state, deflector 104 will deflect stream of material 116 into collector 106 as stream of material 118. In its second state, deflector 104 will deflect stream of material 116 into collector 108 as stream of material 118. Controller 114 will instruct deflector 106, via deflector control signal 124, to periodically switch between the first state and the second state. Accordingly, deflector 106 will periodically fill collector 106 or collector 108.

Controller 114 outputs deflector control signal 124 based on weight signals 120 and 122. In particular, controller 114 instructs deflector 104, via deflector control signal 124, to deflect stream of material 116 as stream of material 118 from collector 106 to collector 108 based on weight signal 120. Similarly, controller 114 instructs deflector 104, via deflector control signal 124, to deflect stream of material 116 as stream of material 118 from collector 108 to collector 106 based on weight signal 122. This will be described, with additional reference to FIGS. 1B-C.

For purposes of discussion, presume that the oats are to be shipped in 10 lb bags. In such a case, collector 106 and collector 108 are going to be large enough to accept a volume of oats equal to 10 lbs. At time $t_0$, as shown in FIG. 1A, deflector 104 is in a first wherein stream of material 116 is deflected as stream of material 118 into collector 106. Weight scale 110 measures the weight of oats in collector 106. Weight scale 110 provides the measured weight, by way of weight signal 120, to controller 114.

As shown in FIG. 1B, the amount of oats in collector 106 is approaching a volume of oats equal to 10 lbs. When the measured weight of the accumulated amount of oats in collector 106 has reached the predetermined threshold, in this example 10 lbs, controller 114 sends deflector control signal 124 to deflector 104. Once deflector 104 has received deflector control signal 124, it will change to its second state. At this time deflector 104 will deflect stream of material 116 as stream of material 118 into collector 108.

FIG. 1C illustrates system 100 at time $t_2$, at this time collector 106 had reached its predetermined weight threshold and collector 108 is now being filled up with a new batch of oats. At this time, while collector 108 is being filled, collector 106 may be removed from system 100 to be emptied and then returned to its position in system 100 as show in FIGS. 1A-C.

A problem with these systems is accuracy and overflow beyond a predetermined threshold. More specifically when a conventional batching system is operating, it is very hard to batch an exact weight of material. For example, for purposes of discussion, presume that the system is arranged to batch 1000 oz. portions of a material. An overflow of 2 oz. is a relatively small error −0.2%. This is a relatively small overflow and may even be within tolerances set for the batch size. However, the accuracy of the batch becomes more important as the predetermined threshold becomes smaller. For example, for purposes of discussion, now presume that the system is arranged to batch 10 oz. portions of a material. In this case, an overflow of 2 oz. is a 20% error. As batch sizes become smaller, accuracy becomes more important. Accuracy of the batch becomes even more critical with regulated materials such as various chemicals and medications. It is particularly important that the amount of material being batched is accurate, and the way this is done in conventional systems is by measuring the weight of the material that has been batched.

The way that the issue of accuracy is addressed in conventional batching systems is by slowing of feeding portion 102. When controller 114 detects that the weight of material within collector 106 is approaching the predetermined threshold, controller 114 instructs feeding portion 102 to slow down by way of feeding portion control signal 126. As feeding portion 102 slows the feed of stream of material 116, a more gradual approach to the predetermined threshold is achieved. This method of slowing down the batching process allows better accuracy and prevents overflow of the material being batched.

Another problem with conventional batching systems is that there is no way to detect the mass of material left in stream of material 116 and stream of material 118. When controller 114 calculates that the weight of material in collector 106 has reached the predetermined threshold it will signal deflector 104 to move from state one to state two and begin filling up collector 108. While this deflector state change is occurring, there is still material falling in stream of material 116 as well as stream of material 118. Material in stream of material 116 and stream of material 118 that is still falling will fall into collector 106 and will contribute to the overflow of material past the predetermined threshold.

Both problems with conventional batching systems, slowing of feeding portion 102 and overflow due to material left in stream of material 116 and stream of material 118, stem from the weight of material in collector 106 being measured continuously. In other words, in conventional batching systems, the weight of the material in the batch (actually in the collector) is measured to determine when the batch meets the predetermined amount.

What is needed is a system and method that can accurately determine the weight of a batch of material in real time, without slowing feeding portion 102 and preventing the unknown amount of material in stream of material 116 and stream of material 118 from falling into collector 106.

BRIEF SUMMARY

The present invention provides a system and method that can accurately determine the weight of a batch of material in real time, without slowing the feeding speed of the material.

In accordance with an aspect of the present invention, a system is provided for feeding a stream of material. The system includes a feeding portion, a material density portion, a detector, a weight calculator or calculating portion and an indicator. The feeding portion can output a portion of the stream of the material from a first position to a second position. The material density portion can generate a density signal based on the density of the material. The detector can detect a volume of the portion of the stream of the material without contacting the portion of the stream of the material and can generate a volume signal based on the detected volume. The weight calculating portion can calculate a weight based on the density signal and the volume signal and can generate a weight signal. The indicator can provide an indication signal based on the weight signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate exemplary embodiments of the present invention and, together with the description, serve to explain the principles of the invention. In the drawings.

DETAILED DESCRIPTION

In contrast with conventional batching systems, in accordance with aspects of the present invention, the weight of the material in the batch (actually in the collector) is not measured to determine when the batch meets the predetermined amount. In accordance with aspects of the present invention, a known density of the material being batched is used. The volume of material being batched in measured in real time, before it is collected in the collector. With the known density and measured volume, an accurate mass (and therefore weight of material) being batched can be accurately determined in real time before it is collected in the collector. Accordingly, in accordance with aspects of the present invention, a batching system need not slow down its feeding process and will nevertheless consistently provide an accurate batching amount for each batch without overshooting a predetermined threshold.

In one example embodiment, the density of the material is a priori information. For example a supplier of the material being batched will provide the batching system operator with the known density of the material being batched. This density is then used with a real time measured volume of the material being batched, to determine in real time the mass, and therefore the weight, of the material being batched.

In another example embodiment, the density of the material being batched is first calculated based on a measured weight and a measured volume. This calculated density is then subsequently used with a real time measurement of volume to calculate a mass, and therefore weight, of the material being batched.

The present invention provides a process for batching material without a need for an entire system slowdown. This process greatly increases efficiency over that of a conventional batching system.

In one aspect of the present invention, density is input to a controller before the batching process begins. In this system a density is input by a user and is then used in conjunction with a volume detector to calculate an exact weight of material that is being batched. Mass is equal to volume multiplied by density, so with density and volume known it is very simple for the controller to calculate mass. Weight equals mass multiplied by gravity, and since both of these variables are known the controller can calculate a weight at any given time. Once the controller has determined that the weight in a collector has reached a predetermined amount, based on detected volume, it can instantly switch the deflector to another position and will begin filling a second collector. At this point the first collector may be emptied or sent to a packaging system, and a new collector may be placed in the system. Once the controller has determined that the second collector is full it will switch the deflector back to its first position and begin filling the new collector. This process may continue for as long as needed with no system slowdown, or as fast as collectors can be taken and replaced.

In another aspect of the present invention, scales are placed under the collectors at the beginning of the process. These scales provide a weight measurement which is used by the controller in conjunction with a volume measurement which is provided by a detector. Weight is equal to mass multiplied by gravity, so with weight measured a mass can be calculated. Density is equal to mass divided by volume, so with an initial values for volume and mass found the controller may easily calculate the density of the material being provided. This calculated density is then used in conjunction with the volume measurement provided by the detector to calculate an accurate weight in any given collector. Once the controller has determined that the weight in a collector has reached a predetermined amount it can instantly switch the deflector to another position and will begin filling a second collector. At this point the first collector may be emptied or sent to a packaging system, and a new collector may be placed in the system. Once controller has determined that the second collector is full it will switch the deflector back to its first position and begin filling the new collector. This process may continue for as long as needed with no system slowdown, or as fast as collectors can be taken and replaced.

Example systems in accordance with aspects of the present invention will now be described with reference to FIGS. 2A-4.

Figure 2A:
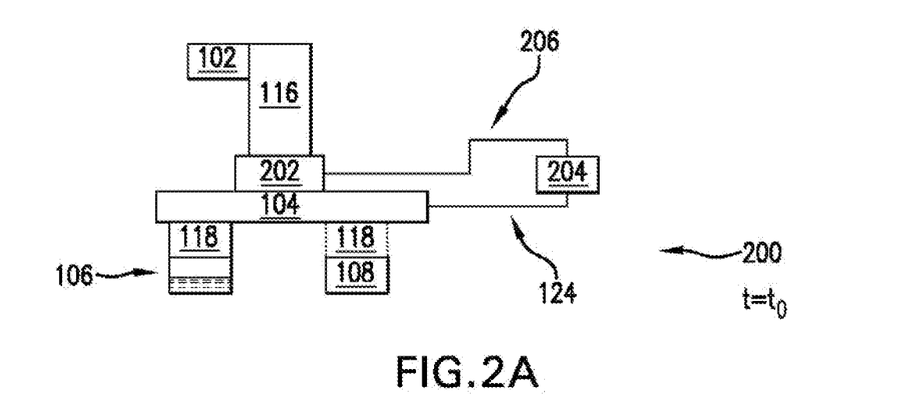
FIGS. 2A-C illustrate an example material batching system in accordance with aspects of the present invention, at times $t_0$, $t_1$, and $t_2$, respectively.
Figure 2B:
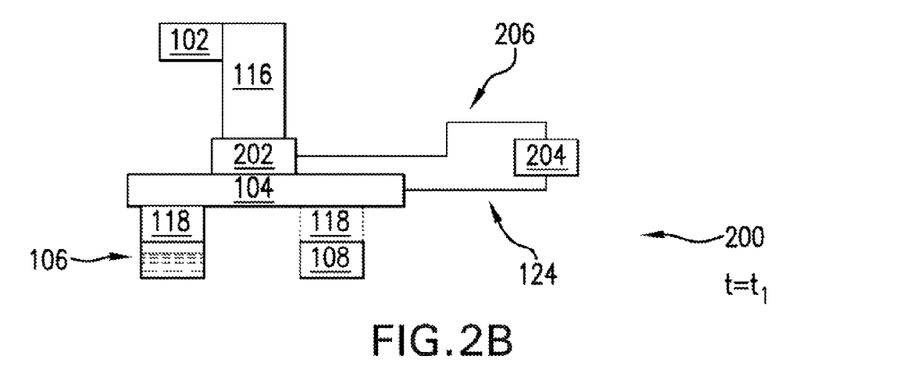
Figure 2C:
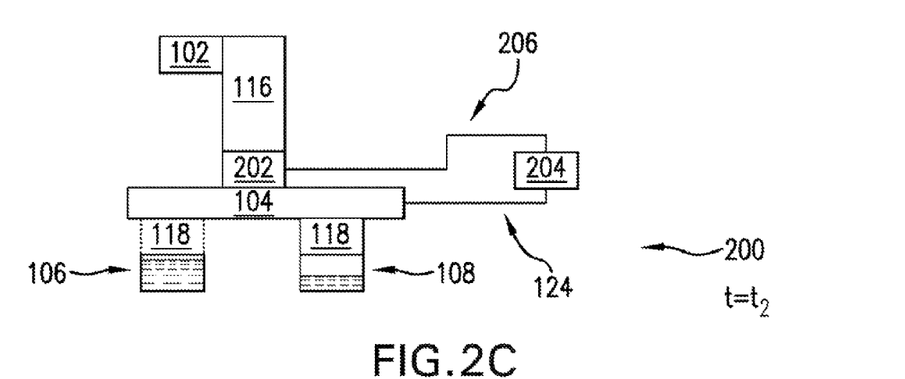

FIGS. 2A-C illustrate an example material batching system 200 in accordance with aspects of the present invention, at times $t_0$, $t_1$, and $t_2$, respectively.

As illustrated in FIG. 2A, system 200 includes feeding portion 102, a detector 202, deflector 104, collector 106 collector 106, collector 108 and a controller 204.

As shown in FIG. 2A, detector 202 is arranged to detect a volume of material within stream of material 116. Controller 204 is arranged to receive a detector signal 206 from detector 202. Deflector 106 is arranged to receive deflector control signal 124 from controller 204.

Detector 202 may be any system or device that is operable to detect the volume of material in stream of material 116. Controller 204 may be any system or device that is operable to deflector 104.

In operation, a large volume of oats (not shown) are dumped into a receiving receptacle (not shown), which feeds the dumped oats to feeding portion 102. The oats are conveyed from one end of feeding portion 102 (closest to the receiving receptacle) to the other end of feeding portion 102, where they continue as stream of material 116.

Detector 202 is positioned immediately before deflector 104 and is operable to measure the volume of material falling in stream of material 116. Deflector 104 will be feeding in one of two states, deflector 104 will deflect stream of material 116 into collector 106 as stream of material 118. In its second state, deflector 104 will deflect stream of material 116 into collector 108 as stream of material 118. Controller 114 will instruct deflector 104, via deflector control signal 124, to periodically switch between the first state and the second state. Accordingly, deflector 104 will periodically fill collector 106 or collector 108.

Detector 202 sends volume signal 206 to controller 204. In this example embodiment, controller 204 has a user interface (not shown) that can be used to input a density of the material being batched. For purposes of this discussion the provider of the oats will know that oats have a given density×per cubic centimeter and will enter this parameter into controller 204. With density and the detected volume known, controller 204 can calculate weight.

Controller 204 outputs deflector control signal 124 based on the weight it calculates. In particular, controller 204 instructs deflector 104, via deflector control signal 124, to deflect stream of material 116 as stream of material 118 from collector 106 to collector 108 based on the calculated weight. Similarly, controller 204 instructs deflector 104, via deflector control signal 124 to deflect stream of material 116 as stream of material 118 from collector 108 to collector 106 based on calculated weight. This will now be described, with additional reference to FIGS. 2A-C.

For purposes of discussion, presume that the oats are to be shipped in 10 lb bags. In such a case, collector 106 and collector 108 are going to be large enough to accept a volume of oats equal to 10 lbs. At time $t_0$, as shown in FIG. 2A, deflector 104 is in a first wherein stream of material 116 is deflected as stream of material 118 into collector 106. With density entered into controller 202 and volume provided by detector 202, via volume signal 206, controller 202 may calculate a weight.

As shown in FIG. 2B, the amount of oats in collector 106 is approaching a volume of oats equal to 10 lbs. When the measured weight of the accumulated amount of oats in collector 106 has reached the predetermined threshold, in this example 10 lbs, controller 204 sends deflector control signal 124 to deflector 104. Once deflector 104 has received deflector control signal 124, it will change to its second state. At this time deflector 104 will deflect stream of material 116 as stream of material 118 into collector 108.

FIG. 2C illustrates system 200 at time $t_2$, at this time collector 106 had reached its predetermined weight threshold and collector 108 is now being filled up with a new batch of oats. At this time, while collector 108 is being filled, collector 106 may be removed from system 200 to be emptied and then returned to its position in system 200 as shown in FIGS. 2A-C.

In contrast with prior art system discussed above with reference to FIGS. 1A-C, in accordance with aspects of the present invention, feed portion 102 does not need to slow down. Further, in accordance with aspects of the present invention, an accurate weight can always and quickly be loaded into collector 106 and collector 108, because there is no longer any need to compensate for material left in stream 116 and stream 118.

Figure 3:
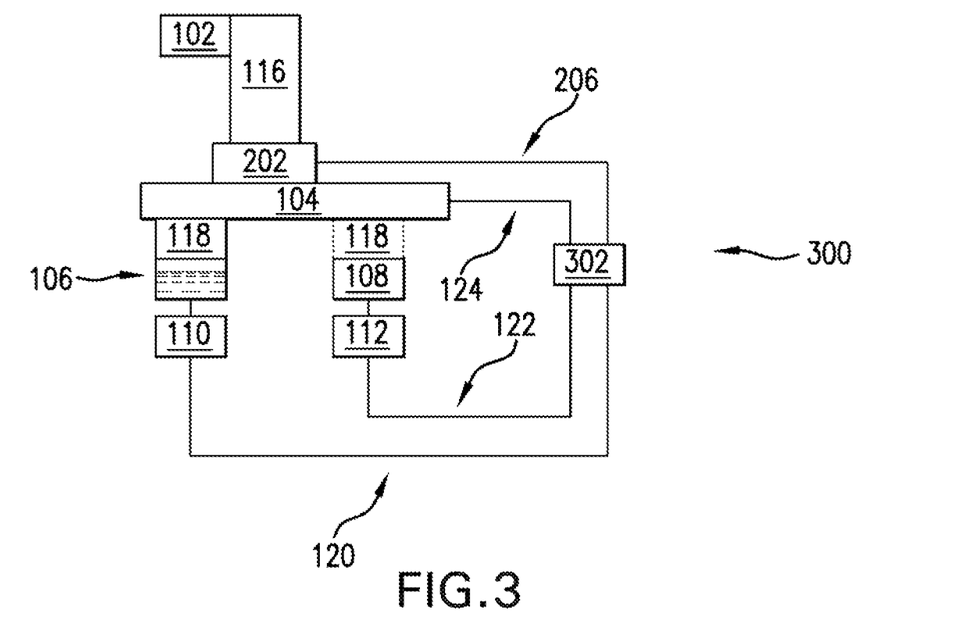
FIG. 3 illustrates another example material batching system in accordance with aspects of the present invention at time $t_0$.

FIG. 3 illustrates another example material batching system 300 in accordance with aspects of the present invention at time $t_0$.

As illustrated in the figure, system 300 includes feeding portion 102, detector 202, deflector 104, collector 106, collector 108, scale 110, scale 112, and a controller 302.

As shown in FIG. 3, detector 202 is arranged to detect a volume of material within stream of material 116. Deflector 104 is arranged to receive stream of material 116 from feeding portion 102. Collector 106 is arranged to receive stream of material 118 from deflector 104. Collector 108 is additionally arranged to receive stream of material 118 from deflector 104. Controller 302 is arranged to receive weight signal 120 from scale 110 and to receive weight signal 122 from scale 112. In addition, controller 302 is arranged to receive volume signal 206 from detector 202. Deflector 104 is arranged to receive deflector control signal 124 from controller 302.

Controller 302 may be any system or device that is operable to deflector 104.

In operation, a large volume of oats (not shown) are dumped into a receiving receptacle (not shown), which feeds the dumped oats to feeding portion 102. The oats are conveyed from one end of feeding portion 102 (closest to the receiving receptacle) to the other end of feeding portion 102, where they continue as stream of material 116.

Detector 202 is positioned immediately before deflector 104 and is operable to measure the volume of material falling in stream of material 116. Deflector 104 will be feeding in one of two states, deflector 104 will deflect stream of material 116 into collector 106 as stream of material 118. In its second state, deflector 104 will deflect stream of material 116 into collector 108 as stream of material 118. Controller 114 will instruct deflector 104, via deflector control signal 124, to periodically switch between the first state and the second state. Accordingly, deflector 104 will periodically fill collector 106 or collector 108.

There is an initial measurement made by weight scale 110 or weight scale 112, and sent to controller 302, via weight signal 120 or weight signal 122. Detector 202 is operable to send volume signal 206 to controller 302. With volume and weight known controller 302 can calculate a density. After this initial calculation is performed the density calculated in conjunction with a volume measurement provided by detector 202 via volume signal 124, an precise weight can be measured.

Controller 302 outputs deflector control signal 124 based on the weight it calculates. In particular, controller 302 instructs deflector 104, via deflector control signal 124, to deflect stream of material 116 as stream of material 118 from collector 106 to collector 108 based on the calculated weight. Similarly, controller 302 instructs deflector 104, via deflector control signal 124 to deflect stream of material 116 as stream of material 118 from collector 108 to collector 106 based on calculated weight. This will now be described, with additional reference to FIG. 3.

Figure 4:
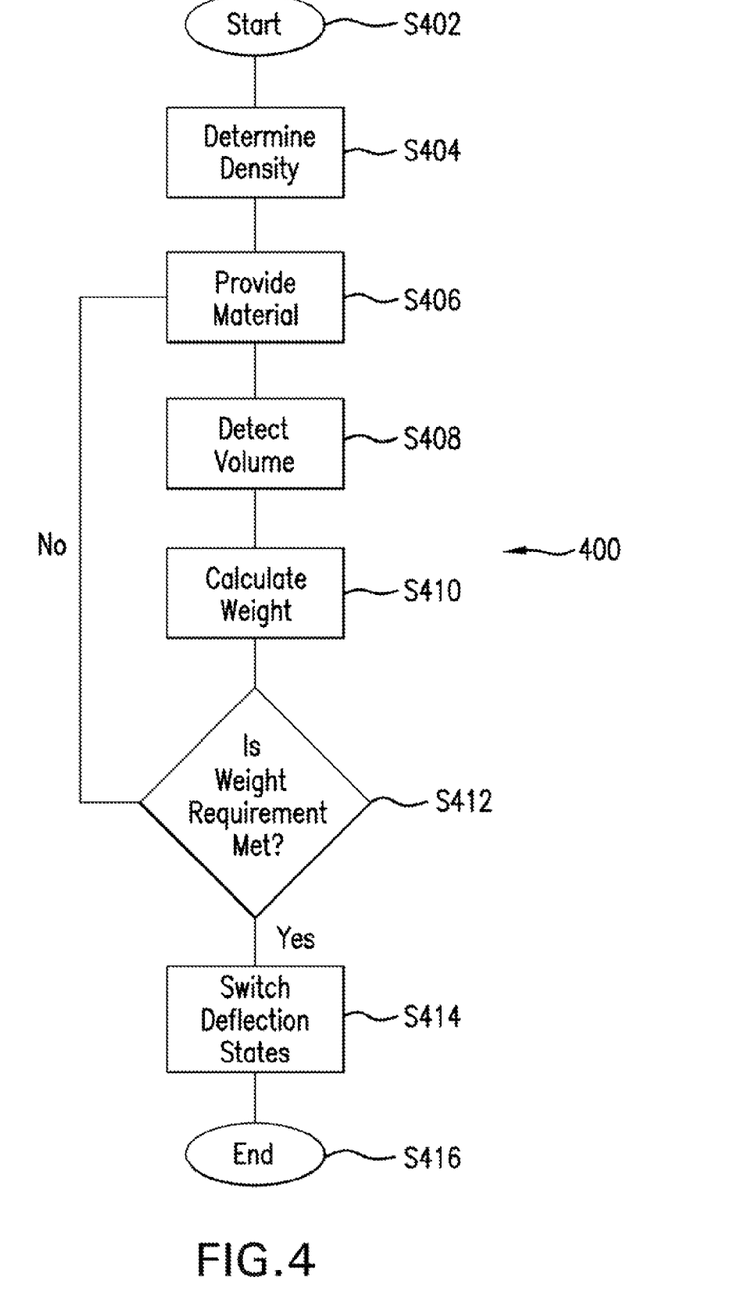
FIG. 4 illustrates an example method of using a batching system in accordance with aspects of the present invention.

FIG. 4 illustrates an example method of using a batching system in accordance with aspects of the present invention.

Method 400 starts (S402), and a density is determined (S404). For example, with reference to system 200 as shown in FIG. 2A, a density is entered into controller 204, the density as discussed above may be provided by the material provider. Alternatively for example, with respect to FIG. 3 an initial density may be calculated by controller 302 after receiving weight signal 120 or weight signal 122 in conjunction with volume signal 124.

Material is then provided to the system (S406). For example, as discussed above with reference system 200 and 300 to FIGS. 2A-C and FIG. 3, respectively, a bulk source of material is delivered to feeding portion 102 by a delivery apparatus. For purposes of explanation, in this example, feeding portion 102 includes a hopper. The oats are conveyed from one end of feeding portion 102 (closest to the receiving receptacle) to the other end of feeding portion 102, where they continue as stream of material 116.

A volume is then detected (S408). For example, volume is detected by detector 202, Detector 202 measures the volume of material in stream 116 as the stream passes through it. Detector 202 then sends volume signal 206 to controller 204 as seen in FIGS. 2A-C and to controller 302 as seen in FIG. 3.

Weight is then calculated (S410). For example, with reference to system 200 as shown in FIG. 2A-C, a volume and a density are entered into controller 204. Controller 204 is able to calculate weight and send deflector control signal 124 as needed. Mass is equal to density multiplied by volume. Mass is easily calculated with a known density and volume. Weight is equal to mass multiplied by gravity, with mass previously being calculated and gravity known a weight can be calculated.

It is then determined whether the weight requirement is met (S412). For example, a determined threshold value for weight is entered into the controller. This threshold could be the weight of material to be packaged, weight limit of a collector, or the weight limit of the packaging system being used. For example, with reference to system 200 as shown in FIG. 2A-C, controller 204 is able to determine weight after knowing volume and density. Controller 204 determines whether the measured weight is equal to the predetermined threshold value.

If it is determined that the weight requirement is not met, then the material is continued to be supplied to the current collector (S406).

If it is determined that the weight requirement is met, then the deflector changes states (S414). If the weight requirement is met, controller 204 will send deflector control signal 124 to switch the state of deflector 104. This state change will begin the process of filling the other empty collector so the currently filled collector may be emptied or switched.

Method 400 then ends (S416).

In contrast with conventional batching systems, in accordance with aspects of the present invention, the weight of the material in the batch (actually in the collector) is not measured to determine when the batch meets the predetermined amount. In accordance with aspects of the present invention, a known density of the material being batched is used. The volume of material being batched in measured in real time, before it is collected in the collector. As a result, the present invention avoids the problems associated with conventional batching systems, namely: slowing of feeding portion and overflow of a batch due to material left in stream as it falls from the feeding portion to the collector.

In one aspect of the present invention, the density variable is input to a controller before the batching process begins. A detector measures the volume of the stream and also sends this information to the controller. With density and volume known the controller can calculate an accurate weight. Once the controller calculates that a predetermined weight limit has been met it can switch a deflector from state one to state two filling up a different collector.

In another aspect of the present invention, the density variable is calculated by using an initial weight measurement from a scale, along with the measured volume. From this point on the controller can use the calculated density along with the volume measured to calculate an accurate weight. Once the controller calculates that a predetermined weight limit has been met it can switch a deflector from state one to state two filling up a different collector.

A benefit of this process is that at no time does the feeding portion have to slow down so an accurate weight can be measured. The process allows for an exact weight to be calculated and also allows for an instantaneous deflector state change. This eliminates the overflow that is accompanied by not knowing the amount of material still falling in stream of material 116 and stream of material 118.

Another benefit of the present invention is, using a known density of the material being batched and by accurately measuring the volume of material being batched in real time, an accurate mass, and therefore weight of material being batched can be accurately calculated in real time. Accordingly, a batching system need not slow down its feeding process and will nevertheless consistently provide an accurate batching amount for each batch without overshooting a predetermined threshold.

The foregoing description of various preferred embodiments of the invention have been presented for purposes of illustration and description. It is not intended to be exhaustive or to limit the invention to the precise forms disclosed, and obviously many modifications and variations arc possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for feeding a stream of material, said system comprising:
    a feeder operable to output a portion of the stream of the material from a first position to a second position;
    a material density portion operable to generate a density signal based on the density of the material;
    a detector operable to detect a volume of the portion of the stream of the material without contacting the portion of the stream of the material and to generate a volume signal based on the detected volume;
    a weight calculator operable to calculate a weight based on the density signal and the volume signal and to generate a weight signal; and
    an indicator operable to provide an indication signal based on the weight signal.

2. The system of claim 1, further comprising:
    a receiver arranged at the second position to receive the portion of the stream of the material;
    a deflector operable to move from a first receiver position to a second receiver position;
    a first batch collector; and
    a second batch collector,
    wherein when said deflector is in the first receiver position, the portion of the stream of the material is operable to pass from said receiver to said first batch collector, and
    wherein when said deflector is in the second receiver position, the portion of the stream of the material is operable to pass from said receiver to said second batch collector.

3. The system of claim 2, wherein the indication signal is operable to instruct said deflector to move from the first receiver position to the second receiver position.

4. The system of claim 3, wherein said detector comprises:
    an electromagnetic emitter operable to emit a first amount of electromagnetic radiation into e portion of the stream of the material; and
    an electromagnetic detector arranged to receive a second amount of electromagnetic radiation from the portion of the stream of the material and operable to detect the volume of the portion of the stream of the material based on the second amount of electromagnetic radiation.

5. The system of claim 2, wherein said detector comprises:
    an electromagnetic emitter operable to emit a first amount of electromagnetic radiation into the portion of the stream of the material; and
    an electromagnetic detector arranged to receive a second amount of electromagnetic radiation from the portion of the stream of the material and operable to detect the volume of the portion of the stream of the material based on the second amount of electromagnetic radiation.

6. The system of claim 1, wherein said detector comprises:
    an electromagnetic emitter operable to emit a first amount of electromagnetic radiation into the portion of the stream of material; and
    an electromagnetic detector arranged to receive a second amount of electromagnetic radiation from the portion of the stream of material and operable to detect the volume of the portion of the stream of material based on the second amount of electromagnetic radiation.

7. The system of claim 1, wherein said feeder comprises a hopper.

8. The system of claim 1, wherein said feeder comprises a conveyer belt.

9. The system of claim 1, wherein said feeder comprises a screw.

10. A method of feeding a stream of material, said method comprising:
    outputting, via a feeder, a portion of the stream of the material from a first position to a second position;
    generating, via a material density portion, a density signal based on the density of the material;
    detecting, via a detector, a volume of the portion of the stream of the material without contacting the portion of the stream of the material;
    generating, via the detector, a volume signal based on the detected volume;
    calculating, via weight calculator, a weight based on the density signal and the volume signal;
    generating, via the weight calculator, a weight signal; and
    providing, via an indicator, an indication signal based on the weight signal.

11. The method of claim 10, further comprising:
    disposing a receiver at the second position to receive the portion of the stream of material;
    positioning a deflector operable to move between a first position and a second position to the first position;
    passing the portion of the stream of material from the receiver to a first batch collector; and
    positioning the deflector to the second position.

12. The method of claim 11, wherein said providing, via an indicator, an indication signal based on the weight signal comprises providing the indication signal instruct the deflector to move from the first position to the second position.

13. The method of claim 12, wherein said generating, via the detector, a volume signal based on the detected volume comprises:

emitting, via an electromagnetic emitter, a first amount of electromagnetic radiation into the portion of the stream of material;

receiving, via an electromagnetic detector, a second amount of electromagnetic radiation from the portion of the stream of material; and detecting, via the electromagnetic detector, the volume of the portion of the stream of material based on the second amount of electromagnetic radiation.

14. The method of claim 11, wherein said generating, via the detector, a volume signal based on the detected volume comprises:

emitting, via an electromagnetic emitter, a first amount of electromagnetic radiation into the portion of the stream of material;

receiving, via an electromagnetic detector, a second amount of electromagnetic radiation from the portion of the stream of material; and detecting, via the electromagnetic detector, the volume of the portion of the stream of material based on the second amount of electromagnetic radiation.

15. The method of claim 10, wherein said generating, via the detector, a volume Signal based on the detected volume comprises:

emitting, via an electromagnetic emitter, a first amount of electromagnetic radiation into the portion of the stream of material;

receiving, via an electromagnetic detector, a second amount of electromagnetic radiation from the portion of the stream of material; and detecting, via the electromagnetic detector, the volume of the portion of the stream of material based on the second amount of electromagnetic radiation.

16. The method of claim 10, wherein said outputting, via a feeder, a portion of the stream of the material from a first position to a second position comprises outputting via a hopper.

17. The method of claim 10, wherein said outputting, via a feeder, a portion of the stream of the material from a first position to a second position comprises outputting via a conveyer belt.

18. The method of claim 10, wherein said outputting, via, a feeder, a portion of the stream of the material from a first position to a second position comprises outputting via a screw.

* * * * *